(12) United States Patent
Ide (10) Patent No.: US 7,562,828 B2
(45) Date of Patent: Jul. 21, 2009

(54) RADIO COMMUNICATION DEVICE, RADIO COMMUNICATION METHOD AND NON-CONTACT IC CARD READER/WRITER DEVICE

(75) Inventor: Satoshi Ide, Narashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 529 days.

(21) Appl. No.: 11/222,845

(22) Filed: Sep. 12, 2005

(65) Prior Publication Data

US 2006/0192007 A1     Aug. 31, 2006

(30) Foreign Application Priority Data

Feb. 28, 2005   (JP)   ............................. 2005-054482
Feb. 28, 2005   (JP)   ............................. 2005-054483

(51) Int. Cl.
*G06K 19/06*   (2006.01)

(52) U.S. Cl. .................... 235/492; 235/441; 235/451

(58) Field of Classification Search ................ 235/441, 235/451, 492

See application file for complete search history.

(56) References Cited

U.S. PATENT DOCUMENTS

| | | | |
|---|---|---|---|
| 4,075,632 A | | 2/1978 | Baldwin et al. |
| 5,072,222 A | * | 12/1991 | Fockens ...................... 342/44 |
| 5,585,617 A | * | 12/1996 | Ohbuchi et al. ............. 235/491 |
| 5,619,529 A | | 4/1997 | Fujioka |
| 5,864,588 A | | 1/1999 | Miyamoto |
| 5,970,148 A | * | 10/1999 | Meier ........................ 713/168 |
| 6,046,683 A | | 4/2000 | Pidwerbetsky et al. |
| 6,223,990 B1 | * | 5/2001 | Kamei ........................ 235/492 |
| 6,249,227 B1 | * | 6/2001 | Brady et al. ............. 340/572.1 |
| 6,601,770 B1 | * | 8/2003 | Ikefuji et al. ................. 235/492 |
| 7,248,108 B2 | * | 7/2007 | Fratti ....................... 330/124 R |
| 2001/0025887 A1 | * | 10/2001 | Murayama et al. .......... 235/492 |

FOREIGN PATENT DOCUMENTS

| | | |
|---|---|---|
| EP | 0 936 571 | 8/1999 |
| EP | 1 168 226 | 1/2002 |
| JP | 8-194785 | 7/1996 |
| JP | 2004-206383 | 7/2004 |
| KR | 10-2004-0009447 | 1/2004 |

OTHER PUBLICATIONS

European Search Report dated Dec. 14, 2005 for Appln. No. 05019582.5.
Austrian Search Report dated Jan. 18, 2008 for Appln. No. 200505909-2.
European Search Report dated Mar. 21, 2006 for Appln. No. 05019582.5-2210.
Korean Office Action dated Sep. 25, 2006 for Appln. No. 10-2005-83618.

* cited by examiner

*Primary Examiner*—Michael G Lee
*Assistant Examiner*—Ali Sharifzada
(74) *Attorney, Agent, or Firm*—Pillsbury Winthrop Shaw Pittman, LLP (57) ABSTRACT

A radio communication device of an example of the present invention is one capable of communicating a plurality kinds of radio communicating media having different resonant frequencies comprises a transmission unit having a first resonant frequency tuned to and resonated with the resonant frequencies of the radio communication media in a prescribed communication range with the radio communication media to transmit signals to the radio communication media and a reception unit having a second resonant frequency not resonated with the resonant frequencies of the radio communication media in the prescribed communication ranges with the radio communication media to receive signals from the radio communication media.

6 Claims, 11 Drawing Sheets

RADIO COMMUNICATION DEVICE, RADIO COMMUNICATION METHOD AND NON-CONTACT IC CARD READER/WRITER DEVICE

CROSS-REFERENCE TO RELATED APPLICATIONS

This application is based upon and claims the benefit of priority from prior Japanese Patent Applications No. 2005-054482, filed Feb. 28, 2005; and No. 2005-054483, filed Feb. 28, 2005, the entire contents of both of which are incorporated herein by reference.

BACKGROUND OF THE INVENTION

1. Field of the Invention

The present invention relates to a radio communication device, a radio communication method and a non-contact IC card reader/writer device for transmitting information to a radio communication medium such as a non-contact IC card and a cellar phone and receiving information from the radio communication medium.

2. Description of the Related Art

In recent years, a con-contact IC card available in non-contact has been widely used in terms of a security of information and a convenience in carrying. A technique in relation to a non-contact information/reception using this kind of non-contact IC card is disclosed by, for example, Jpn. Pat. No. 3,579,899 (Jpn. Pat. Appln. KOKAI Publication No. 8-194785).

For example, a reader/writer provided with a single loop antenna shared in transmission and reception is known. A resonant frequency of this kind of loop antenna shared in transmission and reception is uniquely decided by a capacity (circuit constant) of a capacitor connected to this loop antenna.

A control unit and the loop antenna of the reader/writer are connected with each other by a cable with two lines through a connector. Thereby, the reader/writer can communicate with the IC card through the loop antenna.

An object of the above mentioned reader/writer is to adjust the antenna resonant frequency by adjusting a value of the capacitor connected to the loop antenna shared in transmission and reception and secure a stable communication property and a wide communication area (excellent communication property in assumed and prescribed communication area) with the IC card.

Further, a reader/writer provided with two loop antennas independent for a transmission and a reception, respectively, is known. The resonant frequency of this kind of loop antenna for a transmission is decided by the capacity of the capacitor connected to. And the resonant frequency of this kind of loop antenna for reception is decided by the capacity of the capacitor connected to the loop antenna.

Both of the forgoing two reader/writers for a transmission and a reception have their objects to adjust the antenna resonant frequencies and secure the stable communication properties and the wide communication areas (excellent communication properties in assumed and prescribed communication areas) with the IC cards.

The above-described reader/writer can be compatible, by fixed antenna resonant frequencies, with such specific IC cards in a traffic system for a station operation and an electronic money system and for IC cards different in resonant frequency on IC card sides within narrow ranges (extent to several dozen kHz) and can obtain an excellent communication property.

However, the expand use of IC cards has brought about the following situations.

(i) IC cards made by and issued from a plurality of manufactures and issuers, respectively, are used for the same system.

(ii) Shared IC card are used for a plurality of systems.

In this situation, we are faced to a new problem to be solved. Because of the antenna resonant frequency on the reader/writer side is fixed to the IC cards having largely different antenna resonant frequencies (several hundred kHz-several MHz), such a reader/writer cannot obtain performance (excellent communication property) for an IC card (b) having a different resonant frequency fb even by adjusting an antenna circuit constant, a resonant frequency, etc., thereof so as to make the property excellent for an IC card (a) having a resonant frequency fa. In contrast, in the case of an adjustment on the reader/writer side for the IC card (b), since the IC card (a) is deteriorated in communication property, it is hard for the reader/writer to set both IC cards in order to get excellent properties.

The reason of the above-mentioned problem comes from the fact that the card antennas having different resonant frequencies with each other causes mutual induction with the loop antenna of the reader/writer to cause strong coupling by making both loop antennas for a and a reception be resonant antennas to have the resonant frequency, respectively, and an area in which reception signals from the IC cards are suppressed and brought into a voltage level impossible to demodulate them is generated. As a result, the communication performance of the reader/writer is deteriorated.

BRIEF SUMMARY OF THE INVENTION

An object of the present invention is to provide a radio communication device, a radio communication method and a non-contact IC card reader/writer device capable of preventing deterioration in communication performance.

A radio communication device of an example of the present invention is one capable of communicating with a plurality of kinds of radio communication media having different resonant frequencies, comprising: transmission means having a first resonant frequency tuned to and resonated with resonant frequencies of the radio communication media in prescribed communication ranges with the radio communication media to transmit signals to the radio communication media; and reception means having a second resonant frequency not resonated with the resonant frequencies of the radio communication media in the prescribed communication ranges with the radio communication media to receive signals from the radio communication media.

A radio communication method of an example of the present invention is one capable of communicating with a plurality kinds of radio communication media having different resonant frequencies, comprising: transmitting signals to the prescribed radio communication media in prescribed communication ranges with the radio communication media and controlling a resonant frequency of a transmission/reception antenna for receiving signals from the prescribed radio communication media to a prescribed resonant frequency tuned to and resonated with each resonant frequency of the plurality kinds of each radio communication medium; distinguishing the prescribed radio communication media on the basis of received signals from the prescribed radio communication media through the transmission/reception antenna;

and controlling the resonant frequency of the transmission/ reception antenna on the basis a distinction result.

A non-contact IC card reader/writer device of an example of the present invention is one for performing a transmission and a reception of data to and from an IC card by radio to perform prescribed data processing, comprising: transmission means having a first resonant frequency tuned to and responded with a resonant frequency of the IC card in a prescribed communication range with the IC card to transmit signals to the IC card; reception means having a second resonant frequency not resonated with the resonant frequency in the prescribed communication range with the radio communication media to receive signals from the IC card; and control means for performing the transmission and the reception of the data to and from the IC card through the transmission means and the reception means.

A radio communication device of an example of the present invention is one capable of communicating with a plurality kinds of radio communication media having different resonant frequencies, comprising: a modulation circuit for modulating transmission data; an output line circuit for outputting signals modulated by the modulation circuit; a transmission/reception antenna for transmitting the signals from the output line circuit to the radio communication media and receiving signals from the radio communication media; an input line circuit for inputting the signals from the transmission/reception antenna; a phase control circuit for controlling phases of signals from the input line circuit; and a demodulation circuit for demodulating an output from the phase control circuit.

A non-contact IC card reader/writer device of an example of the present invention is one for performing a transmission and a reception of data to and from an IC card, comprising: a transmission circuit for modulating transmission data to the IC card; an antenna unit having a first resonant frequency tuned to and resonated with a resonant frequency of the IC card in a prescribed communication range with the IC card to transmit an output from the transmission circuit; a phase control circuit for inputting a reception signal from the IC card received through the antenna unit to perform phase control so as not to be resonated to the resonant frequency of the IC card in the prescribed communication range with the IC card; a reception circuit for demodulating an output from the phase control circuit as reception data; and a control unit for performing the transmission and the reception of the data to and from the IC card through the transmission circuit and the reception circuit to perform a prescribed data processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, embodiments of the present invention will be described by referring to drawings.

Figure 1:
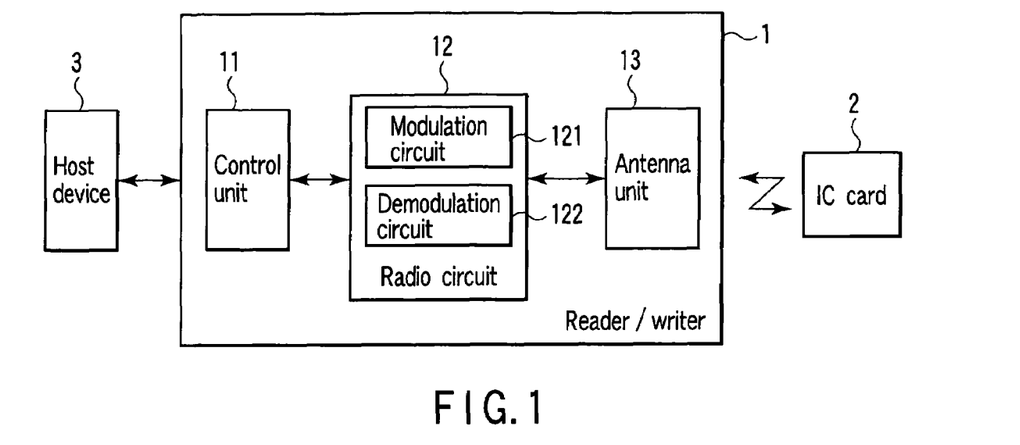
FIG. 1 is a block diagram showing a schematic configuration of a reader/writer regarding an example of a radio communication device of the present invention.

FIG. 1 is the block diagram showing the schematic configuration of the reader/writer (non-contact IC card reader/writer device) regarding the example of the radio communication device of the present invention. As shown in FIG. 1, a reader/writer 1 conducts radio communication with an IC card 2 and has a control unit 11, a radio circuit 12 and an antenna unit 13. Further, the radio circuit 12 has a modulation circuit 121 and a demodulation circuit 122.

Figure 2:
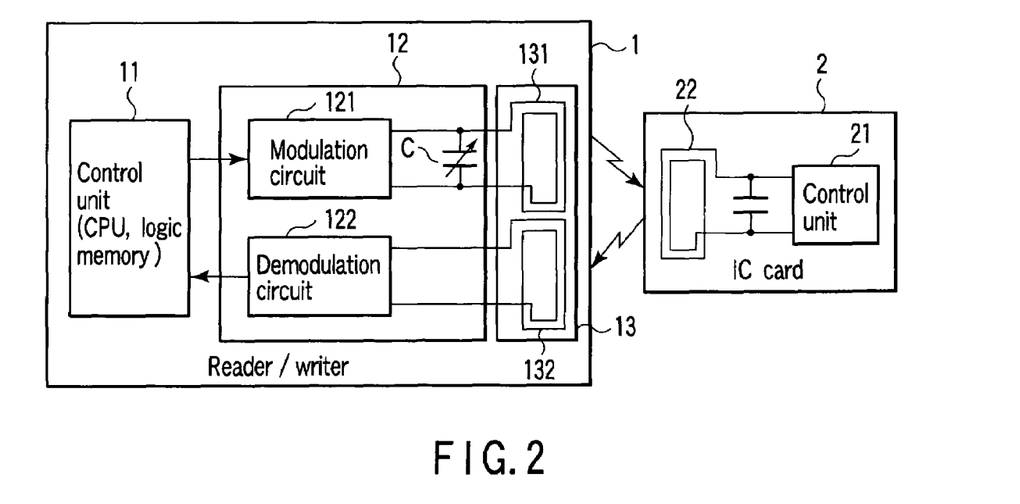
FIG. 2 is a view showing a first example of a configuration of a radio circuit and an antenna unit of the reader/writer shown in FIG. 1.

FIG. 2 is the view showing a first example of a configuration of a radio circuit 12 and an antenna unit 13 of the reader/writer shown in FIG. 1. As shown in FIG. 2, the antenna unit 13 has a antenna 131 composed of a loop coil with a resonant frequency f1 and a reception antenna 132 composed of a loop coil with a resonant frequency f2 (resonant frequency f1<<resonant frequency f2). The radio circuit 12 has a capacitor C connected to antenna ends of the transmission antenna 131. The value of the capacitor C sets the resonant frequency f1 of the loop coil of the transmission antenna 131. The capacitor C may be a capacity variable capacitor and a capacity fixed capacitor. The capacitor C is not connected to antenna ends of the reception antenna 132. In this way, the resonant frequency f2 (a value extremely larger than that of the resonant frequency f1, for example, a value not less that 10 times of the resonant frequency f1) of the loop coil of the reception antenna 132 is set.

The reader/writer 1 receives a variety of commands from a host device 3. The control unit 11 of the reader/writer 1 generates a command (transmission data) for the IC card (radio communication medium) 2 based on the received command. The modulation circuit 121 of the reader/writer 1 modulates the command (transmission data) for the IC card in accordance with a prescribed modulation method. The transmission antenna 131 generates a magnetic field by means of the loop coil with the resonant frequency f1. At this time, if the conditions in which the loop coil with the resonant frequency f1 and the loop coil of an antenna 22 of the IC card 2 cause mutual induction is satisfied [if IC card 2 is in a prescribed communication range (range in which communication effectiveness is assumed in design) of the reader/writer 1], a signal transmitted from the antenna 131 is received though the antenna 22 of the IC card 2.

The control unit 21 of the IC card 2 outputs a response in response to a reception of the command from the reader/writer 1. In other words, the antenna 22 of the IC card 2 outputs the response. The reception antenna 132 of the reader/writer 1 receives this response through the loop coil with the resonant frequency f2. The demodulation circuit 122 demodulates the reception signal in accordance with the prescribed demodulation method to transmit the demodulated reception signal to the control unit 11. The control unit 11 conducts a variety of determinations on the basis of reception data to transmit the determination result to the host device 3.

As mentioned above, by configuring the transmission and reception antennas 131 and 132 independently with each other, the reception antenna 132 becomes nonresonant (no generation of strong coupling) to the resonant frequency of the IC card 2 in a state that the transmission antenna 131 is tuned and resonated to and with the resonant frequency of the IC card 2 involving with the approach of the IC card 2 (in a state that the IC card 2 enters the communicable range of the reader/writer 1). Thereby, it becomes possible for the reader/writer 1 to sufficiently avoid the situation that impedance is increased resulted form the strong coupling and a reception signal voltage level is suppressed by a carrier and the reception signal becomes impossible to be demodulated. Actually, a capacitor C is connected to the reception antenna 132 for matching. For example, assuming that the resonant frequency f1 is approximately 13.56 MHz, the resonant frequency f2 is not less than several hundred MHz.

Figure 3:
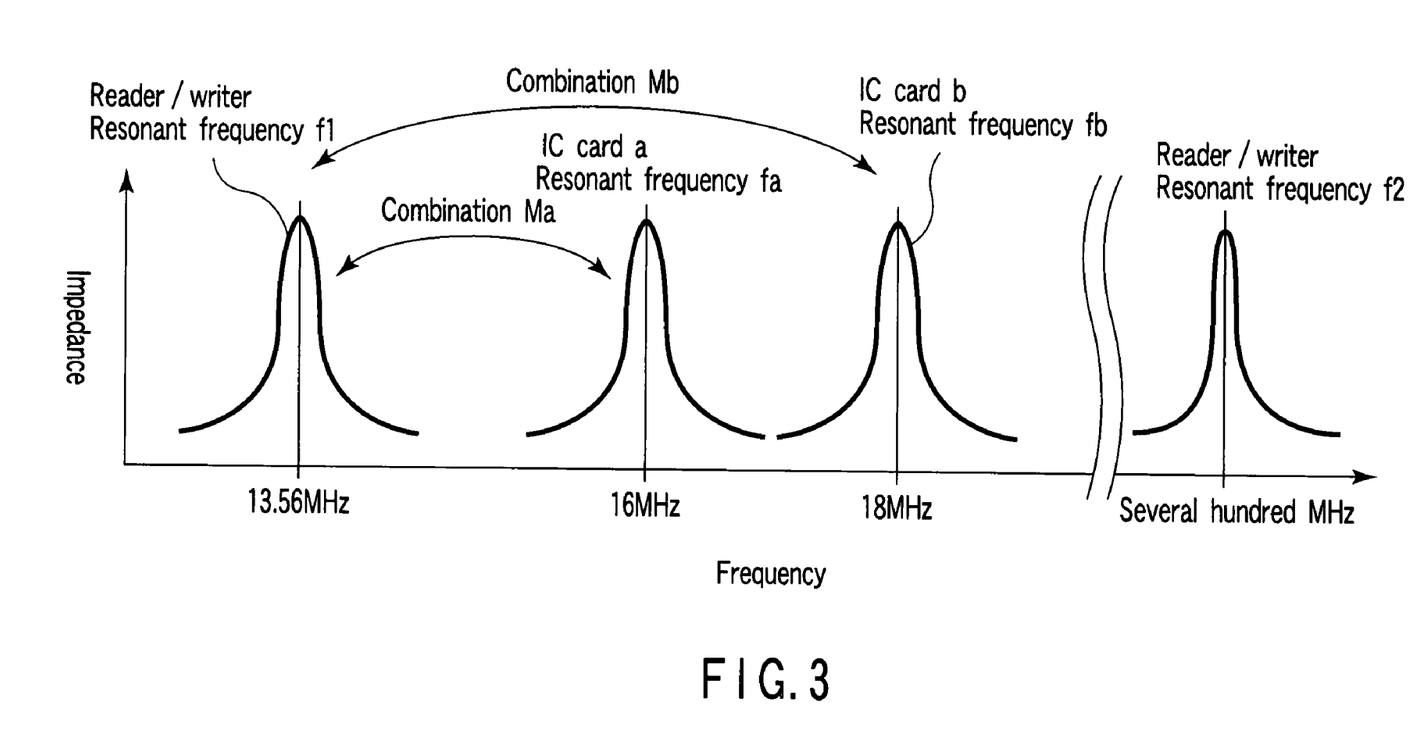
FIG. 3 is a view showing a relation between a resonant frequency f1 and a resonant frequency f2 of the reader/writer shown in FIG. 1 and a resonant frequency fa and a resonant frequency fb of an IC cart to be a target.

FIG. 3 is a view showing a relation between the resonant frequency f1 of the transmission antenna 131 and the resonant frequency f2 of the reception antenna 132 and a resonant frequency fa of an IC card (a) to be a target and a resonant frequency fb of an IC card (b) to be a target. As mentioned above, the resonant frequency f2 is set not less than several hundred MHz to the resonant frequency f1 of approximately 13.56 MHz. Accordingly, assuming that the resonant frequency fa of the IC card (a) to be the target is approximately 16 MHz-17.5 MHz and the resonant frequency fb of the IC card (b) to be the target is approximately 18 MHz-19 MHz, the reception antenna 132 becomes nonresonant to the IC cards (a) and (b).

Figure 4:
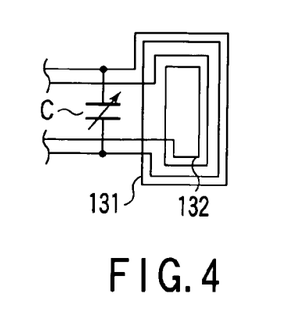
FIG. 4 is a view showing a first example of an arrangement of a transmission antenna and a reception antenna.
Figure 5:
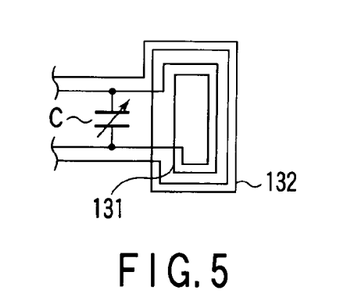
FIG. 5 is a view showing a second example of the arrangement of the transmission antenna and the reception antenna.

Next, examples of arrangements of the transmission antenna 131 and the reception antenna 132 will be described by referring to FIG. 4 and FIG. 5. As shown in FIG. 4, the loop coil of the reception antenna 132 is arranged inside (inner circumference) of the loop coil of the transmission antenna 131. That is, the capacitor C for resonance is connected to opposed ends of the loop coil of the transmission antenna 131 arranged outside (outer circumference) the loop coil of the reception antenna 132. Or, as shown in FIG. 5, the loop coil of the reception antenna 132 is arranged inside (inner circumference) the loop coil of the transmission antenna 131. That is, the capacitor C for resonance is connected to opposed ends of the loop coil of the transmission antenna 131 arranged inside (inner circumference) the loop coil of the reception antenna 132.

Figure 6:
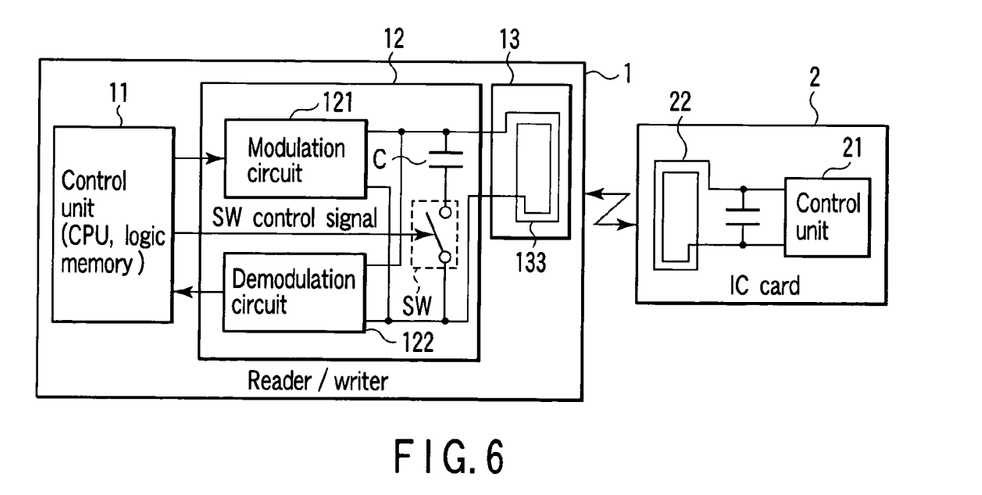
FIG. 6 is a view showing a second example of the configuration of the radio circuit and the antenna unit of the reader/writer shown in FIG. 1.

FIG. 6 is the view showing the second example of the configuration of the radio circuit 12 and the antenna unit 13 of the reader/writer shown in FIG. 1. As shown in FIG. 6, the antenna unit 13 has an antenna shared in transmission and reception 133 composed of a loop coil. The radio circuit 12 has the capacitor C and a switching circuit SW. The capacitor C is connected to one end of the antenna 133 and the switching circuit SW is connected to the other end of the antenna 133. The capacitor C may be a variable capacitance capacitor and may be a fixed capacitance capacitor.

The switching circuit SW switches the opening and closing of a circuit on the basis of a SW control signal from the control unit 11. Thereby, switching circuit SW connects or separates the capacitor C to or from the antenna ends of the antenna 133. When the capacitor C is connected to the antenna ends of the antenna 133 by means of the switching circuit SW, the antenna 133 becomes to be composed of the loop coil with the resonant frequency f1. When the capacitor C is separated from the antenna ends of the antenna 133, the antenna 133 becomes to be composed of the loop coil with the resonant frequency f2 (resonant frequency f1<<resonant frequency f2).

As stated above, even if the reader/writer 1 adopts the antenna 133 which is an antenna shared in transmission and reception, the loop coil of the antenna 133 has the resonant frequency f1 tuned to and resonated with the resonant frequency of the IC card 2 involving with the approach of the IC card 2 by connecting the capacitor C to the antenna ends of the antenna 133 in a period of a data transmission. By separating the capacitor C from the antenna end of the antenna 133 in a period of a data reception, the loop coil of the antenna 133 becomes to have the resonant frequency f2 nonresonant (does not cause strong coupling) to the resonant frequency of the IC card 2.

Figure 7:
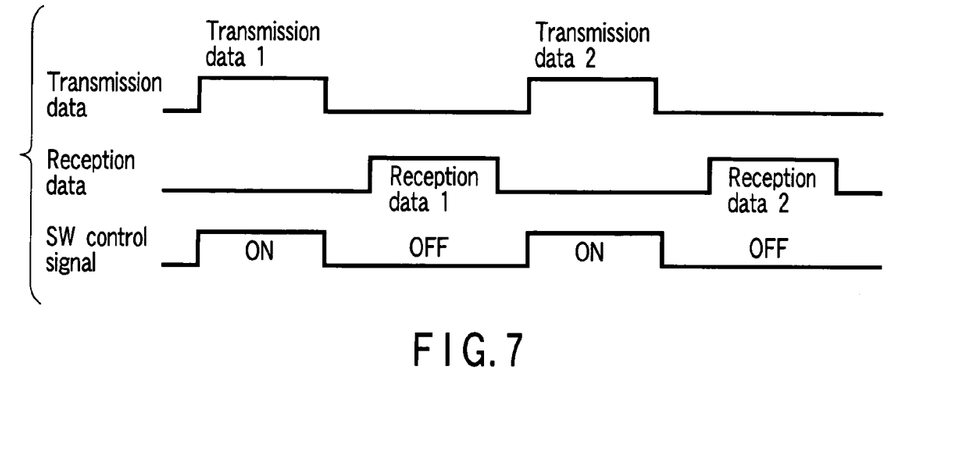
FIG. 7 is a view for explaining control of a switching circuit (hereinafter, referred to as SW) by a SW control signal.

Next, the control for the switching circuit SW by the SW control signal will be explained by referring to FIG. 7.

The control unit 11 outputs (ON) the SW control signal before (just before) starting the transmission of transmission data and stops (OFF) the SW control signal after transmitting (after completion) the transmission data. Thereby, during the transmission of the transmission data, the switching circuit SW connects the capacitor C to the antenna ends of the antenna 133 and makes the loop coil of the antenna 133 have the resonant frequency f1. That is, the loop coil of the antenna 133 enters a resonant state to the loop coil of the antenna 22 of the IC card 2 when the IC card 2 enters the communicable area of the reader/writer 1.

After the completion of the transmission of the transmission data, the IC card enters a data reception waiting state of reception data. The control unit 11 continues to stop (OFF) the SW control signal until the completion of the reception of the reception data. Thereby, during the data reception waiting state and during the reception of the reception data, the switching circuit SW separates the capacitor C from the antenna ends of the antenna 133 and makes the loop coil of the antenna 133 have the resonant frequency f2. That is, the loop coil of the antenna 133 becomes a nonresonant state to the loop coil of the antenna 22 of the IC card 2 even when the IC card 2 enters the communicable area of the reader/writer 1.

The control unit 11 detects the completion of the reception of the reception data to determine the necessity of the transmission of the next transmission data. Then, the control unit 11 outputs (ON) the SW control signal before (just before) starting the transmission of the transmission data and stops (OFF) the SW control signal after transmitting (after completion) the transmission data. Assuming that the control unit 11 cannot detect the completion of the reception of the reception data, the control unit 1 continues the reception waiting state of the reception data until it is determined that the transmission of the transmission data is necessary. Otherwise stated, the control unit 1 continues to stop (OFF) the SW control signal.

With repetition of the foregoing control, the antenna shared in transmission and reception 133 allows the reader/writer 1 to switch the resonance/non resonance for the IC card 2 in transmission/reception thereof.

Figure 8:
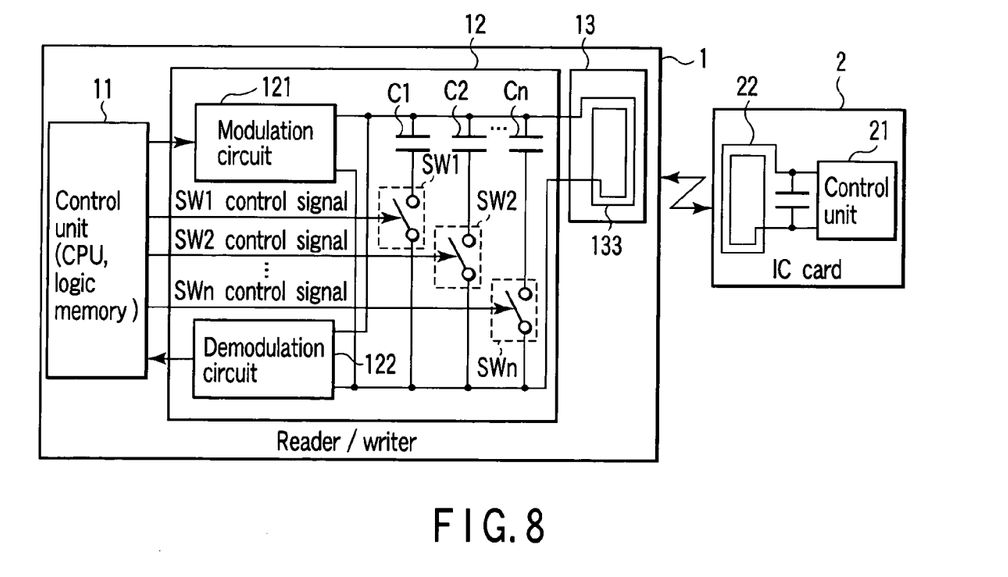
FIG. 8 is a view showing a third example of the configuration of the radio circuit and the antenna unit of the reader/writer shown in FIG. 1.

FIG. 8 is the view showing the third example of the configuration of the radio circuit 12 and the antenna unit 13 of the reader/writer. As shown in FIG. 8, the antenna unit 13 has the antenna shared in transmission and reception 133 composed of the loop coil. The radio circuit 12 has "n" pieces of capacitors C1, C2, -, Cn and "n" pieces of switching circuits SW1, SW2, -, SWn. The capacitors C1, C2, -, Cn may be variable capacitance capacitors and fixed capacitance capacitors.

The capacitor C1 is connected to one end of the antenna 133 and the switching circuit SW1 is connected the other end of the antenna 133. The switching circuit SW1 switches the opening and closing of the circuit on the basis of a SW1 control signal from the control unit 11. Thereby, the control unit 11 connects or separates the capacitor C1 to and from the antenna ends of the antenna 133.

The capacitor C2 is connected to the one end of the antenna 133 and the switching circuit SW2 is connected to the other end of the antenna 133. The switching circuit SW2 switches the opening and closing of the circuit on the basis of a SW2 control signal from the control unit 11. Thereby, the control unit 11 connects or separates the capacitor C2 to and from the antenna ends of the antenna 133.

In similarity, the capacitor Cn is connected to one end of the antenna 133 and a switching circuit SWn is connected to the other end of the antenna 133. The switching circuit SWn switches the opening and closing of the circuit on the basis of a SWn control signal from the control unit 11. Thereby, the control unit 11 connects or separates the capacitor Cn to and from the antenna ends of the antenna 133.

For example, the control unit 11 outputs (ON) both SW1 control signal and SWn control signal to stop (OFF) the SW2 control signal. Thereby, the capacitors C1, Cn are connected to the antenna ends of the antenna 133 and the capacitors C1, Cn decide the resonant frequency of the loop coil of the antenna 133.

For example, in a period from the start of transmission to the completion of transmission of the transmission data the control unit 11 outputs (ON) several control signals among the SW1 control signal, and SW2, -, SWn control signals. In a period from the reception waiting of the reception data to the reception completion of the reception data, the control unit 11 stops (OFF) the whole outputs of the SW1 control signal and SW2, -, SWn control signals. Thereby, the control unit 11 can switch to the resonant antenna to resonate with the IC card 2 in transmission and switch to the nonresonant antenna not to resonate with the IC card 2 in reception. It is possible for the control unit 11 to switch to the resonant antenna even in the reception in accordance with combinations of outputs (ON) and stops (OFF) of the SW1 control signal and SW2, -, SWn control signals.

Figure 9:
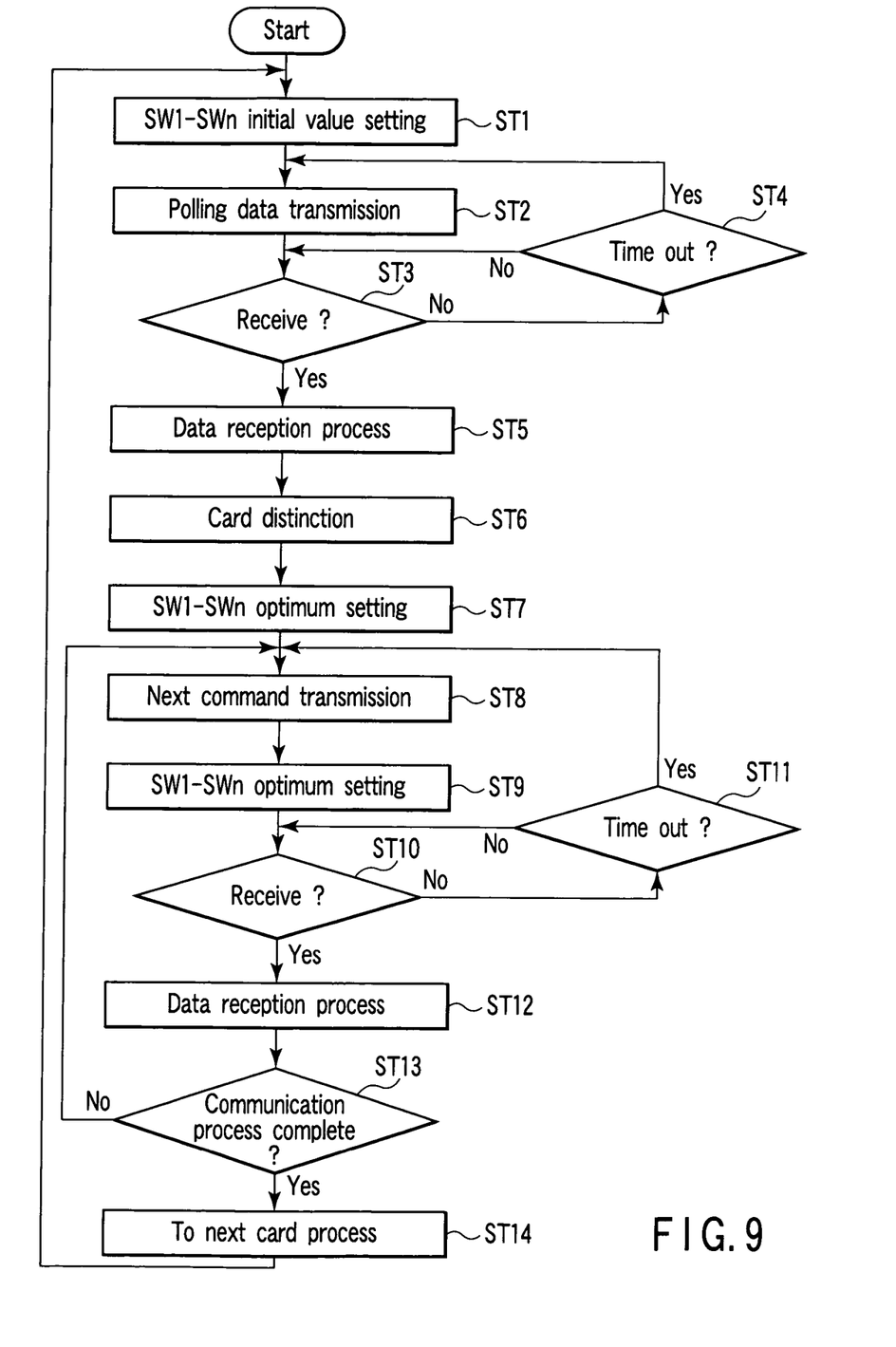
FIG. 9 is a flowchart for explaining an example of switching control of a plurality of SWs of the reader/writer shown in FIG. 8.

FIG. 9 is the flowchart for explaining the example of the switching control of the plurality of SWs of the reader/writer shown in FIG. 8.

The reader/writer 1 (control unit 11) sets the outputs of each control signal from the SW1 control signal and SW2, -, SWn control signals to initial values, respectively (ST 1). Thereby, the resonant frequency of the antenna 133 is controlled to an averaged resonant frequency (may be not an strictly averaged value, may be a frequency to resonate with resonant frequency of IC card with highest utility ratio, in short, may be initially prescribed value) tuned to and resonated with each resonant frequency of a plurality kinds of IC cards to be targeted by the reader/writer 1. Next, the reader/writer 1 transmits a polling command to the IC card 2 so as to obtain a unique number of the IC card 2 (ST 2).

When the reader/writer 1 receives the response from the IC card 2 to the polling command (YES, in ST 3), the reader/writer 1 detects the unique number of the IC card 2 included in the reception data (ST 5) to determine the kind, etc., of the IC card 2 on the basis of the unique number of this IC card 2 (ST 6). When not receiving the response from the IC card 2 to the polling command (NO, in ST 3) and timing out (YES, in ST 4), the reader/writer 1 transmits the polling command to the IC card 2 again (ST 2).

The reader/writer 1 (or host device 3) stores data of optimum resonant frequencies for each kind of the IC cards 2. That is, the reader/writer 1 can read out the resonant frequency optimum to this IC card 2 on the basis of the determination result of the kinds of the IC cards 2. The reader/writer 1 controls outputs (control of ON/OFF) of the SW1 control signal-SWn control signal (even ON of a single SW and even ON of a combination of a plurality of SWs are within realm of possibility) and sets the resonant frequency of the loop coil of the antenna 133 to the resonant frequency optimum to the IC card 2 (ST 7).

The setting of the resonant frequency may be same or different for the transmission and the reception. In the case of setting of the resonant frequencies in same with each other for transmission and for reception, there is no need to set again until the communication with IC card 2 comes to the end. In the case of setting of the resonant frequencies in difference with each other for transmission and for reception, the control unit 11 re-sets at every transmission and reception period until the communication with the IC card 2 comes to the end.

The reader/writer 1 sets the resonant frequency of the loop coil of the antenna 133 to the resonant frequency for transmission optimum to the IC card 2 (ST 7), then, transmits the command to the IC card 2 (ST 8). After completing the transmission of the command to the IC card 2, the reader/writer 1 sets the resonant frequency of the loop coil of the antenna 133 to the resonant frequency or reception optimum to the IC card 2 (ST 9). When receiving a signal from the IC card 2 (YES, in ST 10), the reader/writer 1 processes the reception signal (ST 12). The reader/writer 1 repeats the foregoing setting until the completion of the communication with the IC card 2 and when the communication comes to the end (YES, in ST 13), prepares for processing of the next IC card (ST 14). In other words, the reader/writer 1 (control unit 11) sets the outputs of the SW1 control signal, and SW2, -, SWn control signal to the initial values, respectively.

Figure 10:
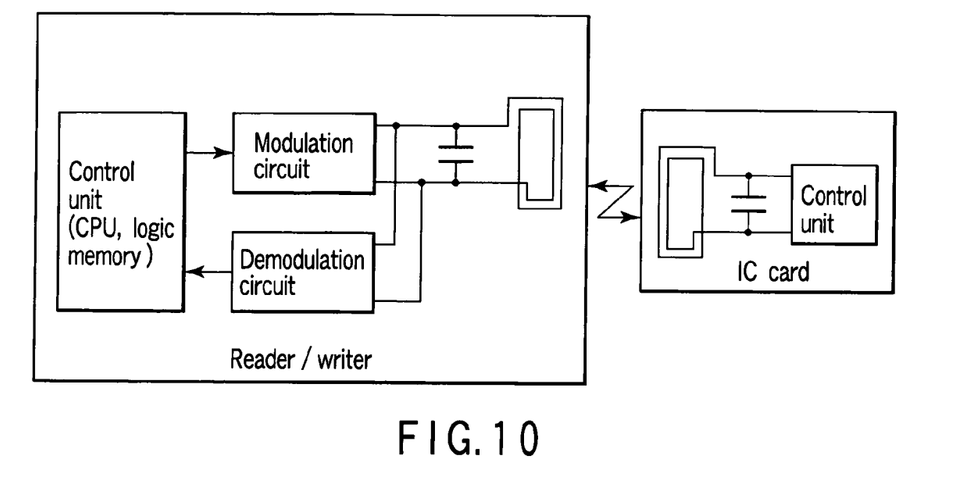
FIG. 10 is a view showing a first example of a reader/writer likely to cause an incommunicable area.
Figure 11:
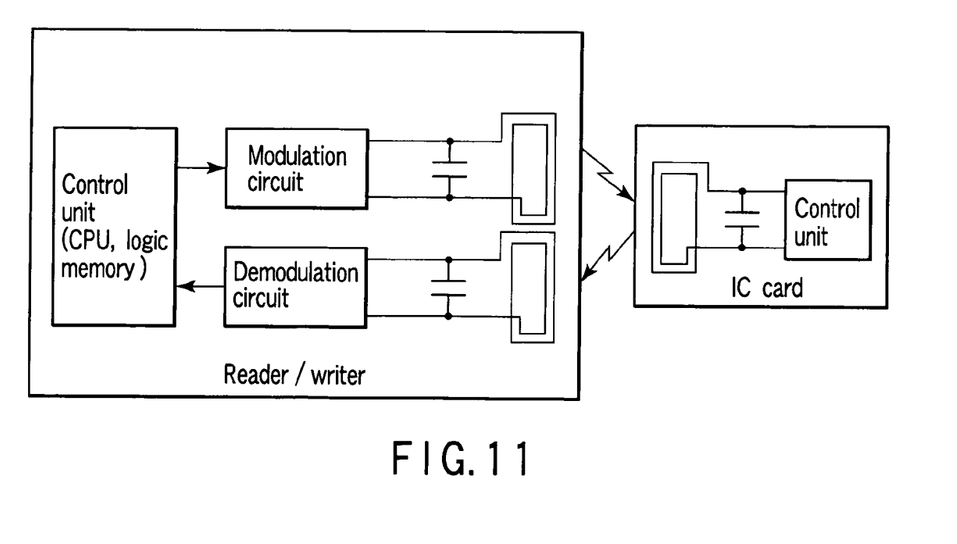
FIG. 11 is a view showing a second example of the reader/writer likely to cause the incommunicable area.
Figure 12:
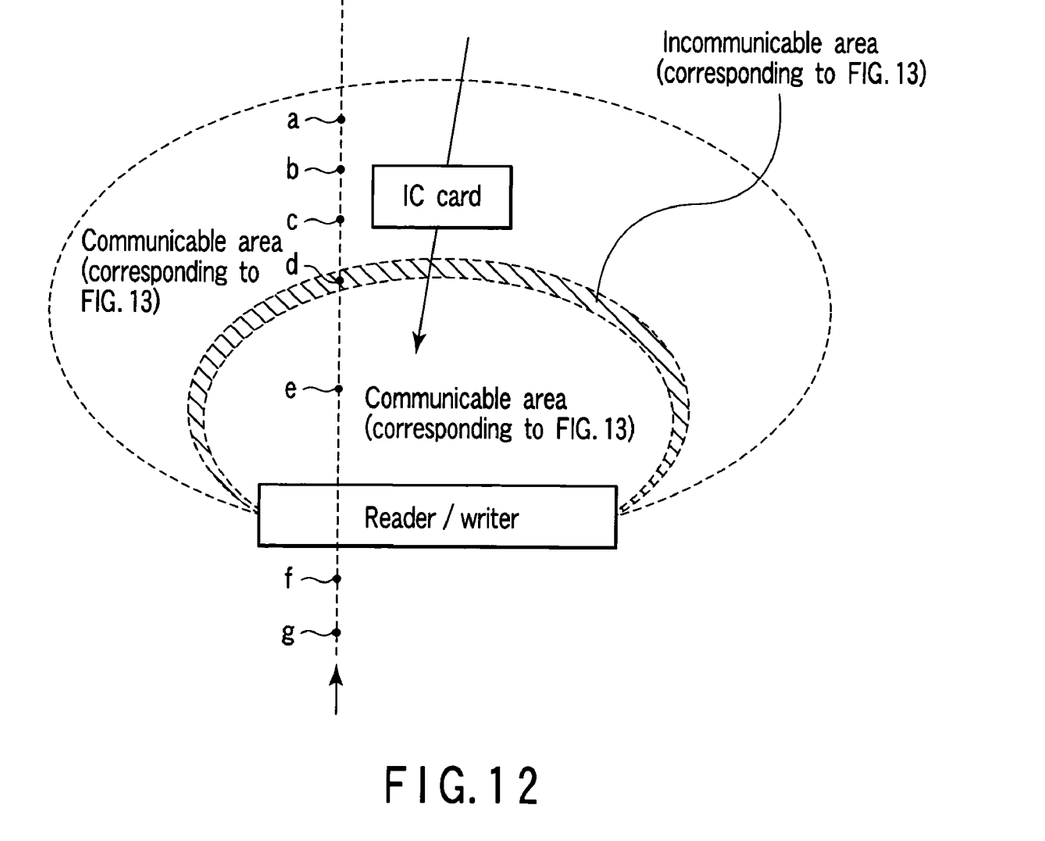
FIG. 12 is a view showing an incommunicable area caused by strong coupling.
Figure 13:
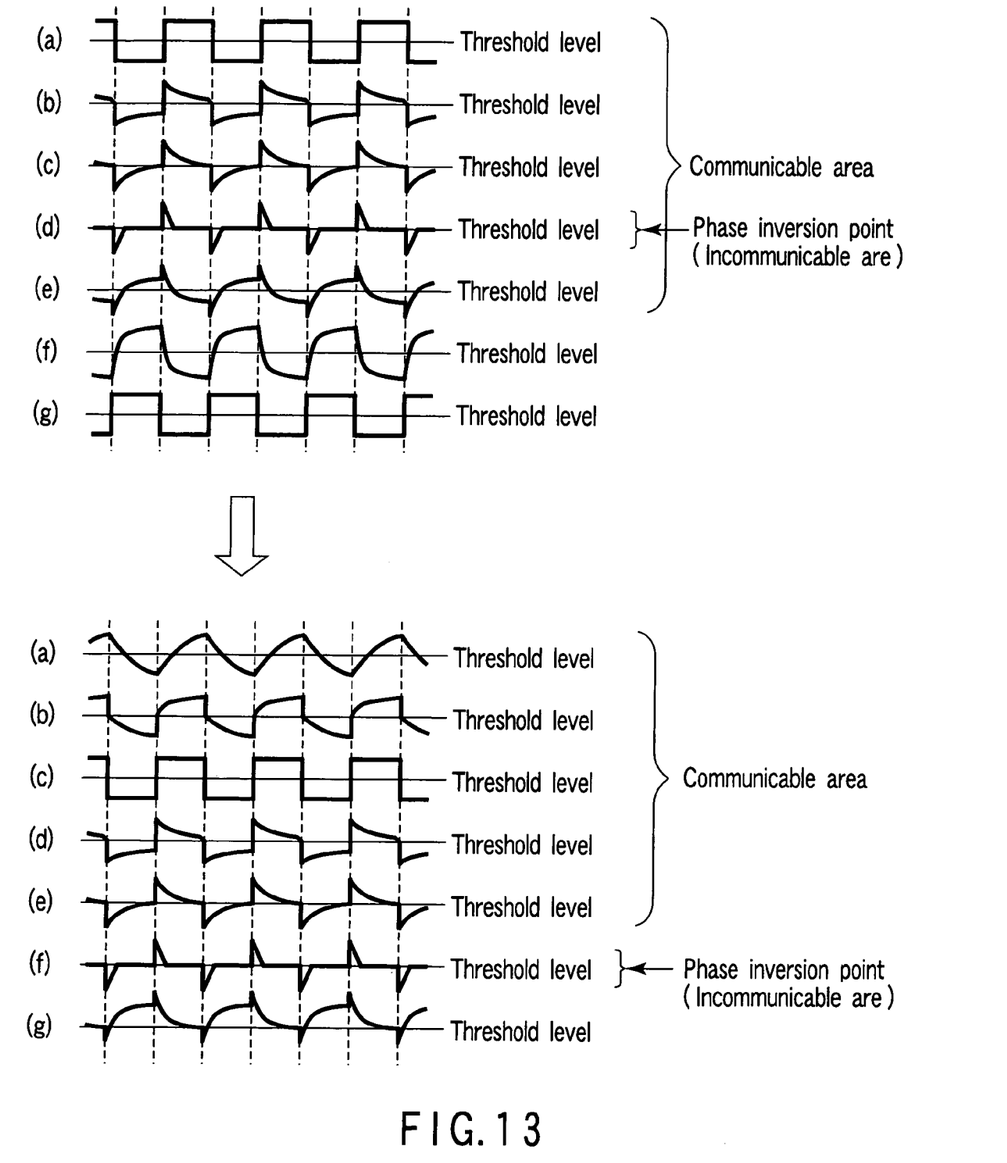
FIG. 13 is a view for explaining an elimination of the incommunicable area to be an effect of the present invention.

Next, the problem of the occurrence of the incommunicable area caused by the strong coupling and the elimination of the incommunicable area, which is the effect of the present invention, will be described by referring to FIG. 10-FIG. 13. FIG. 10 and FIG. 11 are views showing the schematic configurations of the reader/writers likely to cause the incommunicable areas resulted from the strong coupling. FIG. 12 is the view showing the incommunicable area caused by the strong coupling. FIG. 13 is the view for explaining the elimination of the incommunicable area, which is the effect of the present invention.

As shown in FIG. 10, a reader/writer having a single loop antenna shared in transmission and reception. The resonant frequency of such a loop antenna shared in transmission and reception is uniquely decided by a capacity of a capacitor connected to this loop antenna.

As shown in FIG. 11, a reader/writer having two loop antennas respectively independent for transmission and for reception. The resonant frequency of such a loop antenna for transmission is decided by the capacity connected to this loop antenna for transmission. And the resonant frequency of a loop antenna for reception is decided by the capacity of the capacitor connected to this loop antenna for reception.

The reader/writer shown in FIG. 10 and FIG. 11 can be compatible with the antenna resonant frequencies fixed for the IC cards different in resonant frequency on the IC card sides within narrow ranges (extent to several dozen kHz) and can obtain communication properties excellent to some extents, respectively. However, in the case of IC cards largely different (several hundred kHz-several MHz) in antenna resonant frequencies, since the antenna resonant frequency on the reader/writer side is fixed, the reader/writer cannot obtain excellent performance (excellent communication property) for an IC card (b) having a different resonant frequency fb even by adjusting an antenna circuit constant, a resonant frequency, etc., thereof so as to make the property excellent for an IC card (a) having a resonant frequency fa. And in contrast, in the case of an adjustment on a reader/writer side for the IC card (b), since the IC card (a) is deteriorated in communication property, it is hard for the reader/writer to set both IC cards in a state of getting of excellent properties.

The reason of the above-mentioned problem comes from the fact that the card antennas having different resonant frequencies with each other causes mutual induction with the loop antenna of the reader/writer to cause strong coupling because of making both loop antennas for transmission and for reception be resonant antennas to have the resonant frequency and an area is generated, wherein reception signals from the IC cards are suppressed and brought into a voltage level impossible to demodulate the reception signals. As a result, the incommunicable area (refer to FIG. 12) is generated in a communicable area, then, the communication performance of the read/writer is deteriorated.

As shown in FIG. 13, the incommunicable are can be emitted (pushed out) from the communicable area by setting the value of the resonant frequency f2 of the loop coil of the reception antenna 132 to one not less than 10 times of the value of the resonant frequency f1 of the loop coil of the transmission antenna 131 of the reader/writer 2 of the present invention, or by setting the value of the resonant frequency f2 of the loop coil during signal reception by the antenna 133 to one not less than ten times of the value of the resonant frequency f1 of the loop coil during signal reception by the antenna 133 shared for transmission and reception of the reader/writer 2.

Hereinafter, operations and effects resulting from the reader/writers in the first to the third examples of the present invention will be described.

Approximations of coils resonating with each other cause coupling, and becoming strong of the coupling increases impedance to make reception voltage levels of the reception signals from the IC cards close to zero volts. And the incommunicable areas in which the reader/writers cannot demodulate the reception signals or reception accuracy is deteriorated are generated, even if the IC cards are present in the communicable areas on the antennas of the reader/writers (refer to FIG. 12).

Therefore, by individually and separately installing the loop antennas used for transmission and for reception, the strong coupling is prevented from being generated between the loop antenna for reception and the antenna of the IC card not having the resonant frequency with each other.

As a result, a situation to increase the impedance at the occurrence of the strong coupling hardly occurs, the reader/writer can avoid the voltage level of the reception signal from the IC card to be brought into one so that the reception signal cannot be demodulated. Further, a phenomenon (null phenomenon) in which the reception signal cannot be demodulated or the reception accuracy is deteriorated hardly occurs, the incommunicable area making the demodulation of the reception signal impossible does not occur and the reader/writer can achieve the excellent communication property.

When there are several kinds of IC cards which are significantly different in antenna resonant frequency, if the reader/writer uses a resonant antenna for a reception, it becomes hard to secure excellent communication properties for all IC cards by using the set resonant frequency. It is considered that the reader/writer does not occur the strong coupling with some kinds of IC cards but occurs the strong coupling with the remaining several kinds of IC cards.

Then, an antenna unit is configured so as not to cause the strong coupling with any IC card by using a nonresonant antenna as the reception antenna on the reader/writer side.

As a result, as stated above, the reader/writer can achieve the communication property by which the voltage level of the reception signal is not one which is not suitable for demodulating thereof and the incommunicable area is not caused, and can obtain an excellent communication property for a plurality of IC cards which are largely different in antenna resonant frequency.

In contrast, in the case of use of the shared antenna to switch it for transmission and reception, with use of a switching element to switch it at transmission and reception, the reader/writer can switch the shared antenna to the resonant antenna in transmission or to the nonresonant antenna in reception. Being provided with a single of the shared antenna, the reader/writer can obtain the effect similar to that one mentioned above.

As shown in FIG. 8, with use of a plurality of switching elements, in addition to switch the transmission into the resonance and the reception into the non-resonance as described above, it also becomes possible to switch the antenna to one having a plurality of resonant frequencies for transmission and reception. Further, it becomes possible to use an antenna set for the resonant frequency optimum for the specific IC card.

The reader/writer uses the antenna shared in transmission and reception, comprises a plurality of switches in addition to above-mentioned switches to decide an optimum combination of switches for each IC card in advance, then, sets the optimum combination at the time that the IC card starts communication. Thereby, the reader/writer can obtain optimum communication properties in conformity to each IC card.

Figure 14:
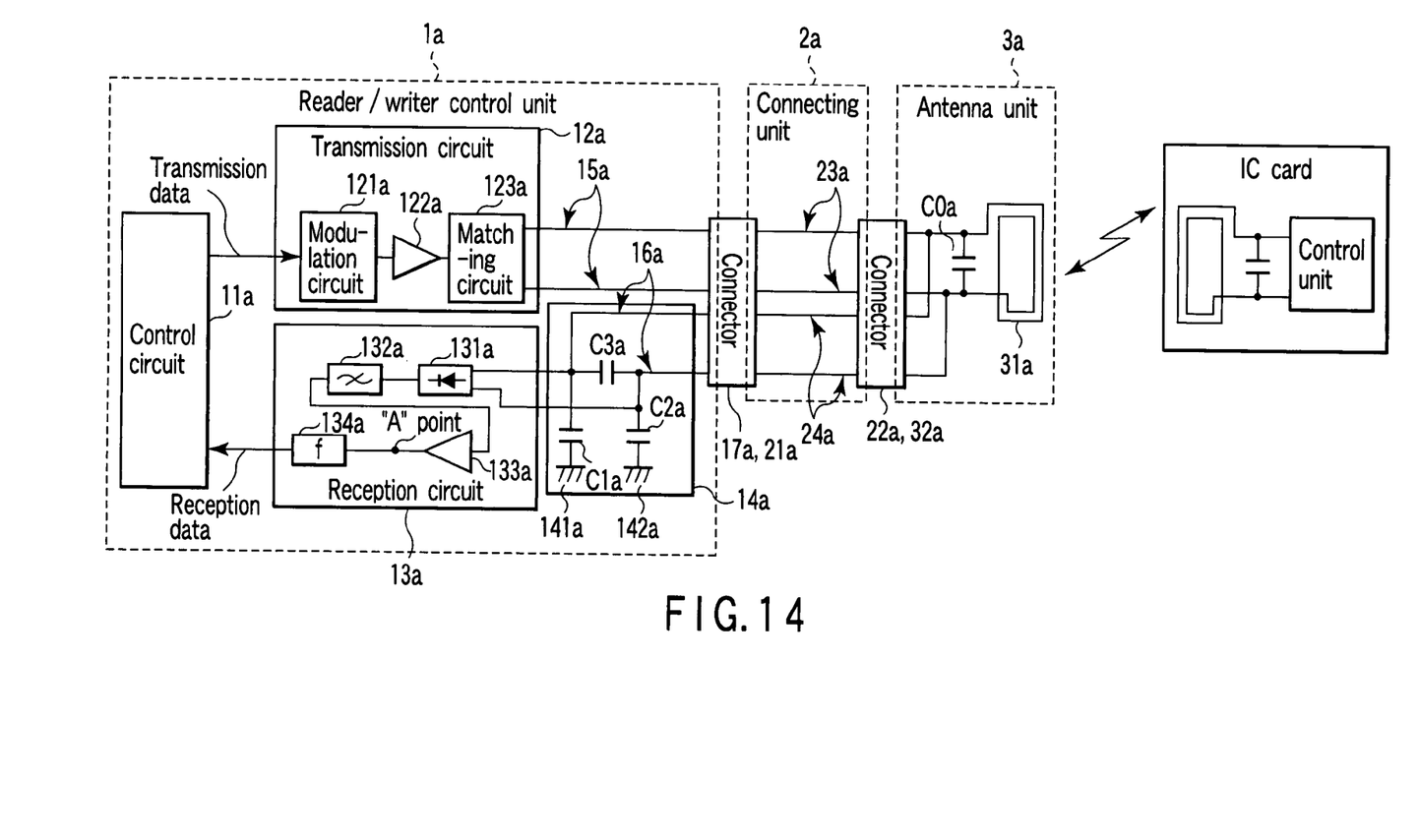
FIG. 14 is a block diagram showing a schematic configuration of a reader/writer regarding a fourth example of the radio communication device of the present invention.

FIG. 14 is the block diagram showing the schematic configuration of the reader/writer (non-contact IC card reader/writer device) regarding the fourth example of the present invention. As shown in FIG. 14, the reader/writer has a reader/writer control unit 1a, a connecting unit 2a, and an antenna unit 3a.

The reader/writer control unit 1a has a control circuit 11a, a transmission circuit 12a, a reception circuit 13a, a phase control circuit 14a, transmission signal lines 15a, reception signal lines 16a, and a connector 17a. The reception circuit 13a has a rectifying circuit 131a, a low-pass filter circuit 132a, a reception signal amplifying circuit 133a, and a digitization circuit 134a. The phase control circuit 14a has capacitors C1a and C2a between the reception signal lines 16a and the grounding circuits 141a, 142a, and has a capacitor C3a between the reception signal lines 16a.

The connecting unit 2a has connectors 21a, 22a, transmission signal lines 23a and reception signal lines 24a.

The antenna unit 3a has a loop antenna 31a, a capacitor C0a and a connector 32a. The antenna unit 3a is a circuit to be tuned at a frequency approximately 13.56 MHz by the capacitor C0a.

The reader/writer control unit 1a and the antenna unit 3a are connected to a four-pole cable through the connecting unit 2a. In other words, the transmission signal lines 15a are connected to the opposed ends of the loop antenna 31a through a connector 17a (transmission signal output line circuit) of the reader/writer connecting unit 1a, a connector 21a of the connecting unit 2a, a connector 22a of the connecting unit 2a and a connector 32a of the antenna unit 3a. The two-pole reception signal lines 16a of the reader/writer are connected with branching from the opposed ends of the loop antenna unit 3a through the connector 17a (reception signal input line circuit) of the reader/writer control unit 1a, the connector 21a of the connection unit 2a, the connector 22a of the connecting unit 2a and the connector 32a of the antenna unit 3a.

Put otherwise, the reader/writer control unit 1a is configured to separate the transmission signal lines and the reception signal lines individually. The reader/writer can vary (control) the phase of the reception signal only by the reception circuit side by adjusting the values of the capacitors C1a, C2a and C3a.

The operations of the forgoing reader/writer will be explained below.

The reader/writer control unit 1a and the antenna unit 3a are connected through the four-pole cable with each other, and the loop antenna 31a of the antenna unit 3a is a resonant circuit having the resonant frequency f1 by means of the capacitor C0a. The reader/writer communicates with a plurality kinds of IC cards (radio communication media) having different resonant frequencies as targets. The resonant frequency to tune and resonate to and with the resonant frequencies of these radio communication media is the foregoing resonant frequency f1.

The phase control circuit 14a provided with capacitors C1a, C2a and C3a has the far away resonant frequency f2 (for example, a resonant frequency f2 apart not less than several hundred MHz from the resonant frequency f1 of 13.56 MHz) and does not affect on the antenna tuning frequency (resonant frequency f1).

Figure 15:
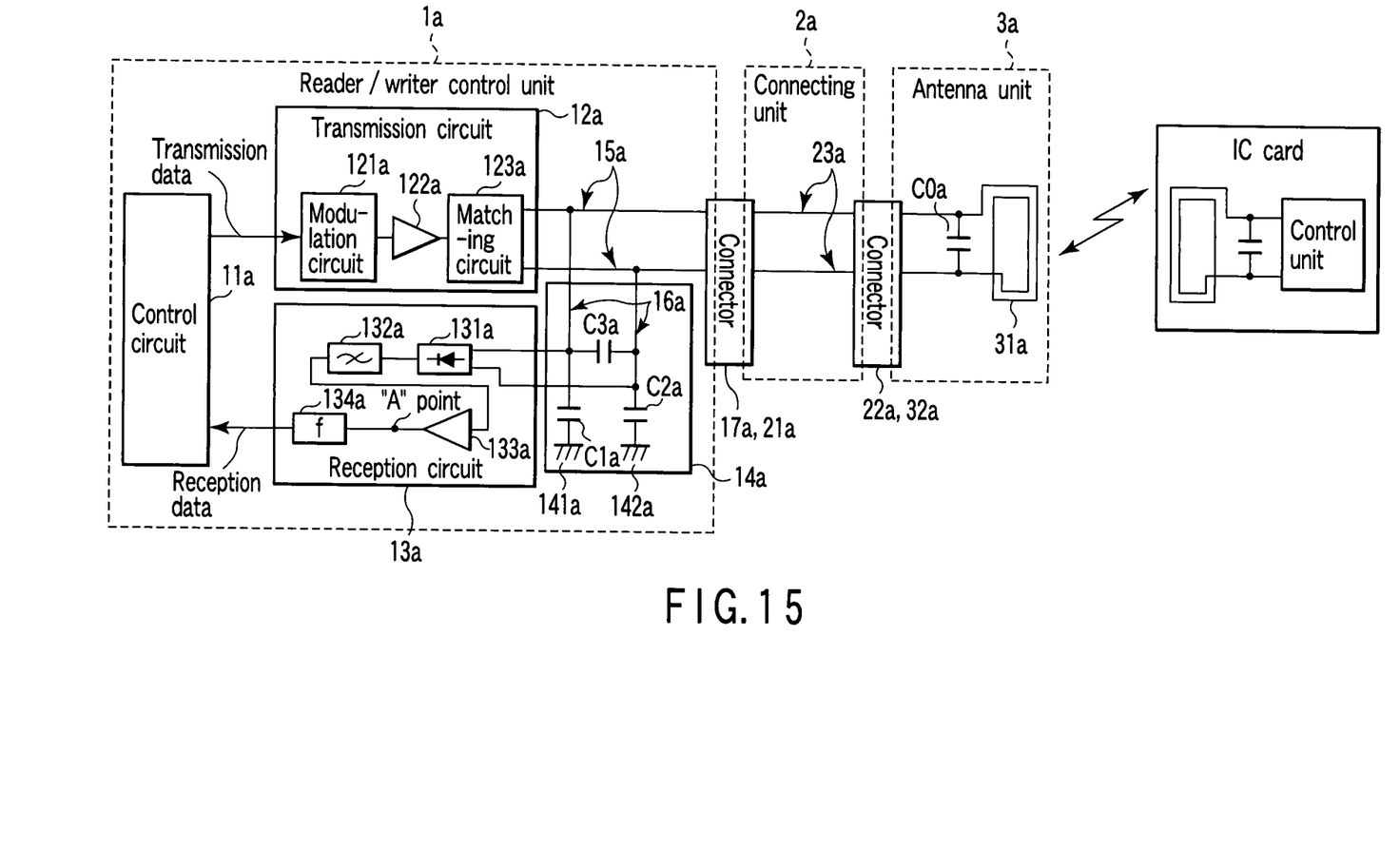
FIG. 15 is a bock diagram showing a schematic configuration of a reader/writer regarding a fifth example of the radio communication device of the present invention.

The reader/writer of the present invention is not limited to the configuration shown in FIG. 14, but may be configured as shown in FIG. 15. FIG. 15 is the block diagram showing the schematic configuration of the reader/writer regarding the fifth example of the radio communication device of the present invention. Otherwise stated, as shown in FIG. 15, the reader/writer may be configured to branch the reception lines 16a from the transmission lines 15a of the reader/writer control unit 1a.

Figure 16:
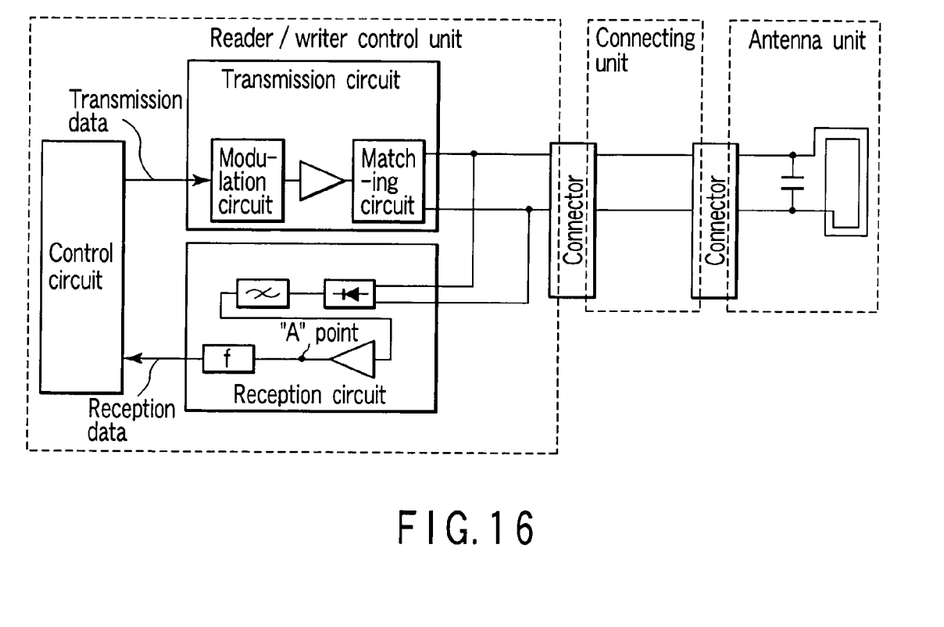
FIG. 16 is a view showing a schematic configuration of a reader/writer likely to cause an incommunicable area in a communicable area.

The problem of an occurrence of the incommunicable area caused by the strong coupling and an elimination of the incommunicable area as an effect of the present invention will be described as follows. FIG. 16 is the view showing the schematic configuration of the reader/writer likely to cause the incommunicable area in the communicable area.

As shown in FIG. 16, a reader/writer provided with a single loop antenna shared in transmission and reception is assumed. A resonant frequency of this type of loop antenna shared in transmission and reception is uniquely decided by the capacity of the capacitor connected to this loop antenna. The loop antenna and the reader/writer control unit are connected with the two-pole cable with each other. The reception circuit of the reader/writer control unit has high impedance, so that it is configured in a manner as if it is not connected to the transmission circuit by viewing from the transmission circuit side. However, it is configured to make a signal (including noise, etc.) from the transmission circuit visible by viewing from the reception circuit side.

The reader/writer shown in FIG. 16 can be compatible with the antenna resonant frequencies fixed for the IC cards different in resonant frequency on the IC card sides within narrow ranges (extent to several dozen kHz) and can obtain the excellent communication property. However, the reader/writer cannot obtain performance (excellent communication property) for an IC card (b) having a different resonant frequency fb even by adjusting an antenna circuit constant, a resonant frequency, etc., thereof so as to make the property excellent for an IC card (a) having a resonant frequency fa. In contrast, in the case of an adjustment on a reader/writer side for the IC card (b), since the IC card (a) is deteriorated in communication property, it is hard for the reader/writer to set both IC cards so as to get excellent properties.

Waveforms (a)-(g) of an upper side of FIG. 13 are views showing phase variations of a reception signal at "A" point of the reader/writer shown in FIG. 16 example. As shown at the upper side of FIG. 13, a phase inversion point is generated within a communicable area in the antenna shared in transmission and reception and the IC card. That is, an incommunicable area (refer to FIG. 12) by which a reception signal cannot be demodulated accurately is caused in a communicable area. As a result, the reader/writer shown in FIG. 16 becomes impossible to obtain an excellent communication property in some conditions.

Among waveforms (a)-(g) on the upper side of FIG. 13, waveforms of (a) and (g) are reception signal ideal in waveform. The waveforms of (a) and (g) are those capable of surely determining "1" and "0" compared to threshold levels. In other words, the waveforms of (a) and (g) are waveforms capable of being converted into "1" and "0" signals through the digitization circuit and being demodulated thorough the control unit.

The waveform of (d) indicates the phase inversion point and signal amplitude become into a state close to zero V. This state is a phenomenon which occurs in the case that the antenna shared in transmission and reception of the reader/writer and the antenna of the IC card approach with each other to the extent to cause an electromagnetic induction. When the waveform of (d) is generated within the communicable area, the reception signal cannot be accurately demodulated at the generation spot of the waveform (d). That is, the reader/writer in FIG. 16 is likely to generate the waveform of (d) within the communicable area, then, cannot obtain an excellent communication property at the generation spot (incommunicable area) of the waveform (d).

The waveforms of (a)-(g) on a lower side of FIG. 13 are views showing an example of phase variations of a reception signal an A point of the reader writer shown in FIG. 14. By adjusting the values of capacitors C1, C2 and C3 of the reader/writer shown in FIG. 14, the reader/writer can vary (control) a waveform of a signal received from the IC card through the loop antenna 31a. Thereby the reader/writer can put out the phase inversion point (incommunicable area) outside the communicable area to allow a stable communication inside the communicable area. Otherwise stated, the reader/writer can eliminate the incommunicable area from the communicable area of the reader/writer, as a result, an excellent communication property can be exhibited.

Hereinafter, operations and effects of the reader/writer regarding the forth and fifth examples of the present invention will be described collectively.

The reader/writer of the fourth example of the present invention is configured to bring about the transmission signal lines and the reception signal lines independent with each other and separate the transmission circuit and the reception circuit with each other. Furthermore, the capacitors C1a, C2a and C3a are inserted between the reception signal lines and the grounding circuits and between the reception signal lines. Thereby, with adjustment of these capacitors C1a, C2a and C3a, the reader/writer can adjust the communication property of the reception circuit it self.

Each reader/writer regarding the fourth and fifth examples of the present invention shifts the phase of the reception signal entering the reception circuit and shifts the phase inversion point (incommunicable are) outside the communicable area and can establish the communicable area not including the incommunicable area.

With insertion of capacitors C1a, C2a and C3a, the reader/writer can adjust the matching between the antenna shared in transmission and reception and the reception circuit can prevent the cable of the reception lines from becoming an antenna by decreasing impedance on the reception side and can obtain an effect of suppression of noises radiated from the cable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication device capable of communicating with a plurality of kinds radio communication media having different resonant frequencies, comprising:
   a modulation circuit for modulating transmission data;
   an output line circuit for outputting signals modulated by the modulation circuit;
   a transmission/reception antenna for transmitting the signals from the output line circuit to the radio communication media and receiving signals from the radio communication media;
   an input line circuit for inputting signals from the transmission/reception antenna;
   a phase control circuit for controlling phases of signals from the input line circuit; and
   a demodulation circuit for demodulating an output from the phase control circuit;
   wherein the phase control circuit controls its own resonant frequency to a second resonant frequency which is different from a first resonant frequency of the transmission/reception antenna, tuned to and resonated with resonant frequencies of the radio communication media and which is not resonated with the resonant frequencies of the radio communication media.

2. The radio communication device according to claim 1, wherein
   the phase control circuit includes capacitors disposed between the input line circuit and the demodulation circuit.

3. The radio communication device according to claim 1, wherein
   the phase control circuit includes a capacitor disposed between the input line circuit and the demodulation circuit; and a capacitor disposed between the line input circuit and a grounding circuit.

4. The radio communication device according to claim 1, wherein
   the output line circuit and the input line circuit comprises connecting units to which the transmission/reception antenna is freely detachable.

5. A non-contact IC card reader/writer device for performing transmission and reception of data to and from an IC card, comprising:
   a transmission circuit for modulating transmission data to the IC card;
   an antenna unit having a first resonant frequency tuned to and resonated with a resonant frequency of the IC card in a prescribed communication range with the IC card to transmit an output from the transmission circuit;
   a phase control circuit for inputting a reception signal from the IC card received through the antenna unit to perform phase control, so as not to be resonated to the resonant frequency of the IC card in a prescribed communication range with the IC card;
   a reception circuit for demodulating an output from the phase control circuit as reception data; and
   a control unit for performing transmission and reception of the data to and from the IC card through the transmission circuit and the reception circuit to perform a prescribed data processing.

6. The non-contact IC card reader/writer device according to claim 5, further comprising:
   a connecting unit for freely detachable the antenna unit, the transmission circuit and the phase control circuit.

* * * * *